US012721307B1

(12) United States Patent
Stemple et al.

(10) Patent No.: US 12,721,307 B1
(45) Date of Patent: Sep. 1, 2026

(54) FEEDER SYSTEM AND METHOD OF USE

(71) Applicant: Trophy Feed LLC, Kemp, TX (US)

(72) Inventors: Zachary David Stemple, Fort worth, TX (US); Garrett Burnett, Fate, TX (US)

(73) Assignee: Trophy Feed LLC

( * ) Notice: Subject to any disclaimer, the term of this patent is extended or adjusted under 35 U.S.C. 154(b) by 0 days.

(21) Appl. No.: 19/208,299

(22) Filed: May 14, 2025

Related U.S. Application Data

(63) Continuation of application No. 18/937,306, filed on Nov. 5, 2024, now abandoned.

(60) Provisional application No. 63/665,311, filed on Jun. 28, 2024.

(51) Int. Cl.
*A01K 5/02* (2006.01)
*A01M 31/00* (2006.01)

(52) U.S. Cl.
CPC .......... *A01K 5/0225* (2013.01); *A01K 5/0291* (2013.01); *A01M 31/008* (2013.01)

(58) Field of Classification Search
CPC .. A01K 5/0225; A01K 5/0291; A01M 31/008
See application file for complete search history.

(56) References Cited

U.S. PATENT DOCUMENTS 7,178,481 B1 * 2/2007 Friesenhahn, Jr. .. A01K 5/0225 119/57.91
7,798,098 B1 * 9/2010 Patterson ............ A01K 5/0225 119/51.11
8,096,265 B1 * 1/2012 Wisecarver .......... A01K 5/0225 119/56.2
D787,751 S * 5/2017 Bosco .......................... D30/121
11,856,925 B1 * 1/2024 Sanderford .......... A01K 5/0225
12,004,491 B1 * 6/2024 Van Delden ......... A01K 5/0291
2010/0307421 A1 * 12/2010 Gates .................. A01K 5/0225 119/57.91
2014/0174368 A1 * 6/2014 Salinas ............... A01K 5/0291 119/51.11
2015/0181801 A1 * 7/2015 Niemela ............. A01C 17/001 119/51.01
2015/0272079 A1 * 10/2015 Evans ................. A01K 5/0225 119/51.01
2016/0095291 A1 * 4/2016 Gates ....................... A01K 5/01 119/52.1

(Continued)

OTHER PUBLICATIONS

Boss Buck, 350# All-In Video Featuring Buckventures Outdoors, published Mar. 27, 2014, url: https://www.youtube.com/watch?v=rEhU3it86TA (Year: 2014).*

*Primary Examiner* — Joshua D Huson
*Assistant Examiner* — Edgar Reyes
(74) *Attorney, Agent, or Firm* — Richard Eldredge; Leavitt Eldredge Law Firm

(57) ABSTRACT

A feeder system with two-in one approach that can be interchanged from a gravity feed mode to a throw mode as and when required. It comprises of a central housing configured to flange and in communication with a bin, a plurality of windows configured to the central housing to spread a feed across the area from the bin, a plurality of feeder chutes configured to connect to each other via one or more support structures to the central housing. The plurality of feeder chutes comprises of a flap or lip to prevent the feed from leaving the opening of a feeder chute.

5 Claims, 4 Drawing Sheets

(56) References Cited

U.S. PATENT DOCUMENTS

2023/0032509 A1* 2/2023 Michalec ............. A01K 5/0225
2024/0389550 A1* 11/2024 McMillan ............ A01K 5/0291
2024/0423159 A1* 12/2024 Strauss ................ A01K 5/0225
2025/0127142 A1* 4/2025 Gates ................... A01K 5/0291

* cited by examiner 103
102
109
110
108
101
106

FEEDER SYSTEM AND METHOD OF USE

BACKGROUND

1. Field of the Invention

The present invention relates generally to feeder systems and methods of use.

2. Description of Related Art

Gravity or free choice and throw or broadcast feeders are well known in the art and are effective means to feed deer and other animals. It should be understood that these are the two primary types of deer feeders on the market. These different types of feeders are used during specific times of the season depending on the hunter's goal.

FIG. 5 illustrates a conventional deer gravity feeder system 201 including a storage bin 103 configured to store deer feed therein and supported at a height relative to the ground surface via legs 207. The feeder 201 includes a feeder 207 configured to distribute the deer feed to the deer. The feeder 201 includes a main chute 209 in communication with the storage bin 203 and a plurality of feeder chutes 211 configured to provide access to the deer feed via main chute 209.

Although effective, currently switching between gravity mode and throw mode can be difficult, messy, and time consuming. Current means of detaching the couplings include a wrench that is fitted around the periphery of the coupling, which in turn is rotated until the coupling detaches. There are several other ways as well including quick connects, wing nuts, etc. to detach. One of the problems commonly associated with this process is the time and effort to remove the feeder and associated couplings.

Accordingly, it is an object of the present application to provide a two-in-one feeder system that can be interchanged from a gravity feeder mode to a throw mode as and when required.

DESCRIPTION OF THE DRAWINGS

FIG. 3 is a perspective view of motor housing in accordance with a preferred case of the present application.

DETAILED DESCRIPTION

Figure 1:
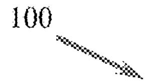
FIG. 1 is perspective view of the feeder system with components.
Figure 1:
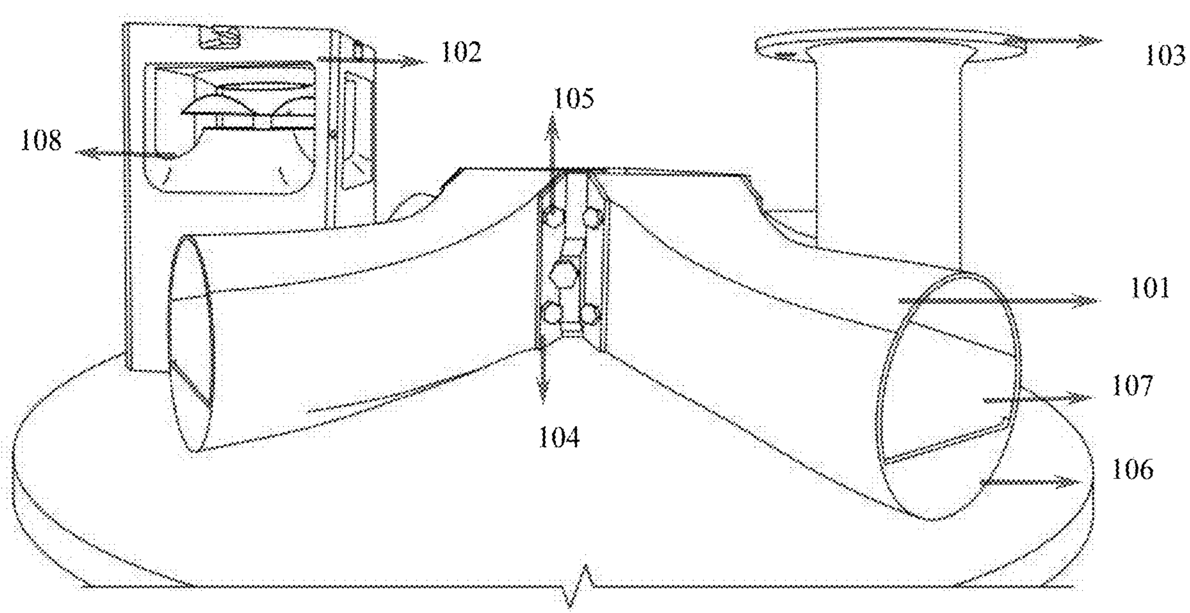

Illustrative cases of the system and method of use of the present application are provided below. It will of course be appreciated that in the development of any actual case, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use will be understood, both as to its structure and operation, from the accompanying drawings, taken in conjunction with the accompanying description. Several cases of the system are presented herein. It should be understood that various components, parts, and features of the different cases may be combined together and/or interchanged with one another, all of which are within the scope of the present application, even though not all variations and particular cases are shown in the drawings. It should also be understood that the mixing and matching of features, elements, and/or functions between various cases is expressly contemplated herein so that one of ordinary skill in the art would appreciate from this disclosure that the features, elements, and/or functions of one case may be incorporated into another case as appropriate, unless described otherwise.

Figures 2, 3:
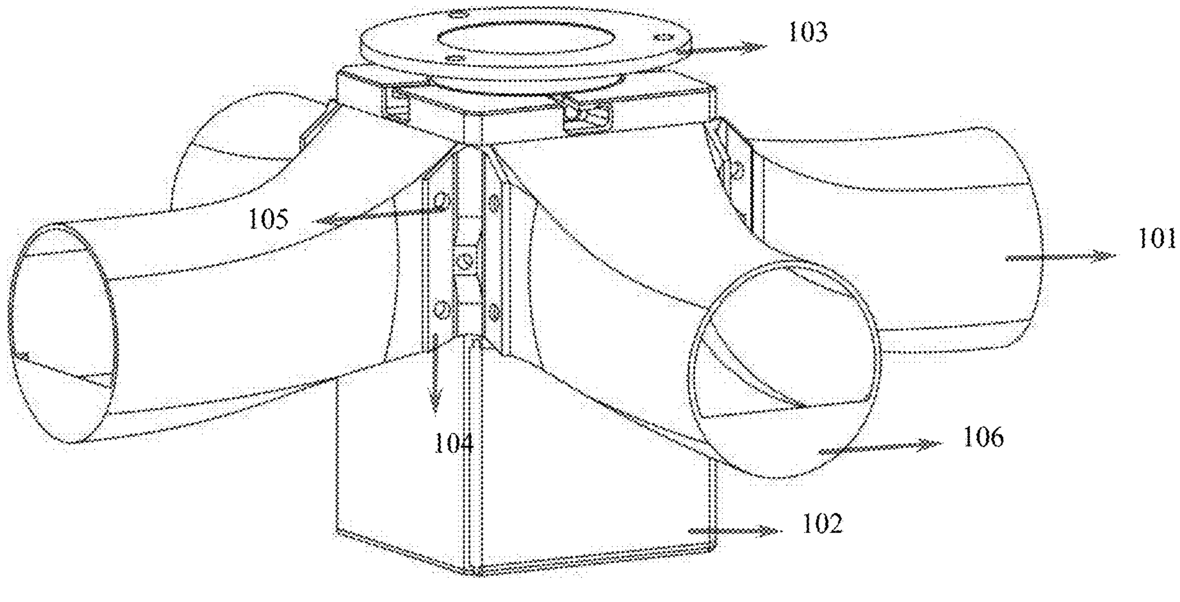
FIG. 2 is an oblique view of a feeder in accordance with a preferred case of the present application.
FIG. 3 is an oblique view of a feeder in accordance with a preferred case of the present application.

The preferred case herein described is not intended to be exhaustive or to limit the invention to the precise form disclosed. It is chosen and described to explain the principles of the invention and its application and practical use to enable others skilled in the art to follow its teachings The technology described herein fulfills a preferred feeder system 100 as shown in FIG. 1 comprising feeder chutes 101, a central housing 102, a flange 103 as basic components to make the feeder system 100. The feeder chutes are connected to each other via one or more support structures including but not limited to brackets 104 using one or more fasteners including but not limited to spring pins 105 to the central housing as shown in FIG. 2. The feeder chutes comprise of a lip 106 to prevent feed from leaving the opening 107. The central housing 102 comprises of a plurality of windows 108 to spread the feed across an area when in throw mode. In accordance with the technology described herein, this objective is obtained by providing a system or a feeder 100 that can be incorporated on new and existing feeder systems.

FIG. 2 shows the feeder system 100 in our preferred gravity feed mode and FIG. 3 shows the feeder system 100 in our preferred throw feed mode. The feeder chutes 101 are connected to the central housing 102 via one or more support structures including but not limited to brackets 104 via one or more fasteners including but not limited to spring pins covering the plurality of windows 108 to work in the gravity feed mode. The central housing 102 in turn is connected to the flange 103 to be connected to an existing or new hopper or bin. An user can pull outward the spring pins, in our preferred case, to move the feeder chutes 101 from gravity feed mode to throw feed mode or vice versa. FIG. 3 shows the feeder system 100 in throw feed mode, wherein the feeder chutes 101 are moved to a different position as compared to the feeder system in FIG. 2. In our preferred case, the feeder chutes are moved up and down to change from gravity feed mode to throw feed mode as shown in FIG. 3 uncovering the plurality of windows 108 and a throw plate 109 to spread the feed across the area. The feeder chutes are connected to each other via a central opening 110 in communication with the central housing 102.

Figure 4:
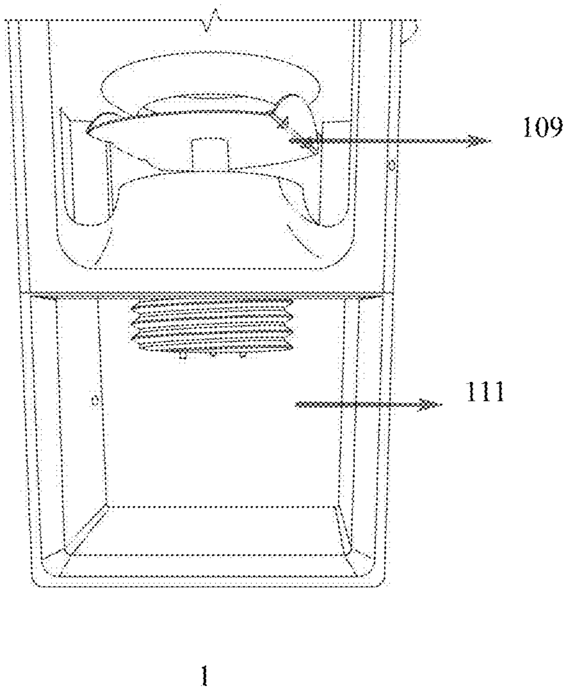
Figure 4:
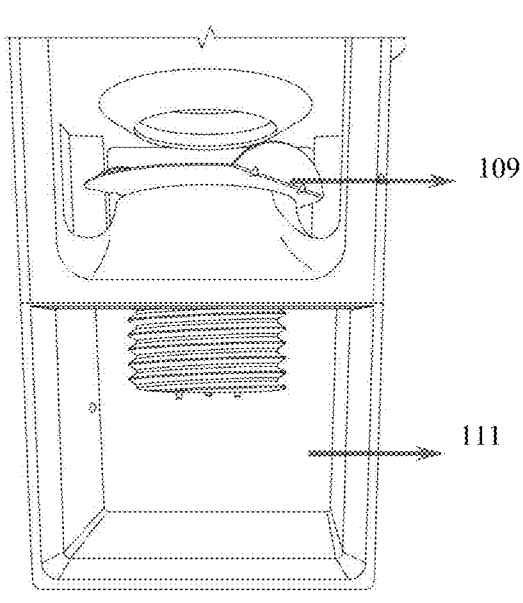
Figure 5:
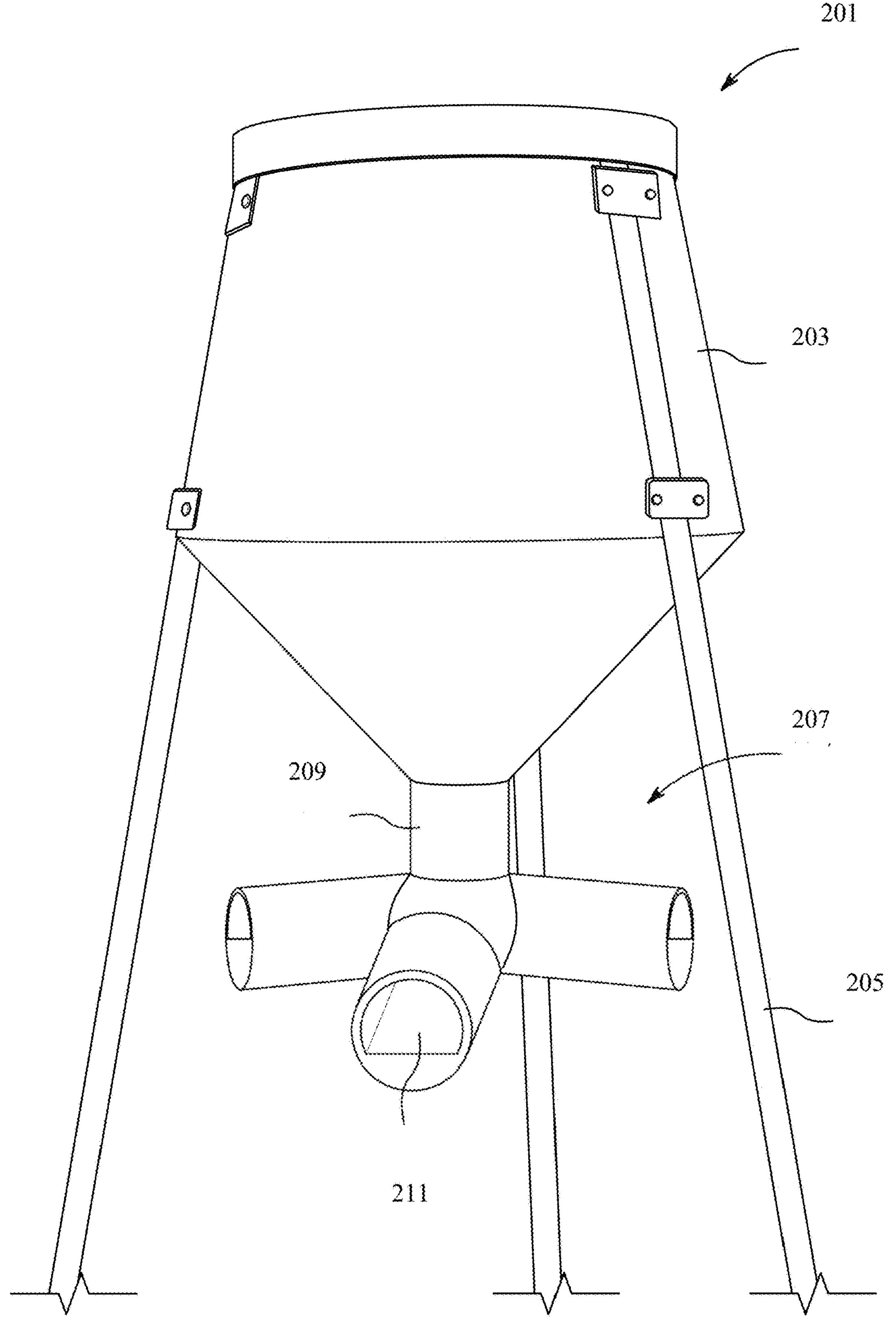
FIG. 5 is an oblique view of a feeder system as shown in the art.

FIG. 4 shows the motor housing 111 within the central housing 102. In our preferred case, the motor housing is accessed from one side of the central housing 102 via a door (not shown). The motor housing 111 can move from a first position to a second position to adjust the throw plate. In our preferred case, the motor housing is threaded up and down to adjust the throw plate 109 as shown in FIG. 4. This is important as it allows the user to adjust how much feed can come out in throwing or broadcasting or in gravity. The central housing, in our preferred case further includes but not limited to batteries that power the feeder system, timer allowing the user to time the feed, changing the feed from gravity feed mode to throw mode as desired.

The particular cases disclosed above are illustrative only, as the cases may be modified and practiced in different but equivalent manners apparent to those skilled in the art having the benefit of the teachings herein. It is therefore evident that the particular cases disclosed above may be altered or modified, and all such variations are considered within the scope and spirit of the application. Accordingly, the protection sought herein is as set forth in the description. Although the present cases are shown above, they are not limited to just these cases but are amenable to various changes and modifications without departing from the spirit thereof.

What is claimed is:

1. A feeder system, wherein the feeder system comprises:

a flange configured to connect to a central housing, wherein the flange is configured to be fastened to the bottom of a bin or an existing hopper, thereby locking the central housing through guide holes at a top of the central housing;

a plurality of windows in the central housing to spread a feed from the bin;

a plurality of feeder chutes configured to the central housing to provide gravity feed from the bin, wherein the feeder chutes is configured to connect with each other via the central housing;

one or more support structures configured to hold the plurality of feeder chutes to the central housing;

one or more fasteners configured to selectively switch the feeder system from a first feed to a second feed; and a motor housing configured to be threaded from a first position to a second position to adjust a throw plate, wherein movement of the motor housing changes a distance between the throw plate and the central housing;

wherein the motor housing is integrated with the plurality of feeder chutes.

2. The feeder system of claim 1, wherein the first feed is a gravity feed and the second feed is a throw feed.

3. The feeder system of claim 1, wherein the one or more fasteners comprises a spring pin configured to selectively switch the feeder system from a gravity feed to a throw feed or vice versa.

4. The feeder system of claim 1, wherein the motor housing is threaded relative to the central housing to adjust the throw plate.

5. The feeder system of claim 1, wherein the central housing further comprises:

a central opening, wherein the feeder chutes are configured to be connected to each other via the one or more support structures; and wherein the motor housing is operatively coupled to the central opening and is configured to be threaded relative thereto between a first position and a second position to adjust the throw plate.

* * * * *